(12) United States Patent
Shah et al.

(10) Patent No.: US 6,462,457 B2
(45) Date of Patent: Oct. 8, 2002

(54) POWER GENERATOR

(75) Inventors: Manoj Ramprasad Shah, Latham, NY (US); Sameh Ramadan Salem, Rexford, NY (US); Ronald Irving Longwell, Ballston Lake, NY (US); Patrick Lee Jansen, Alplaus, NY (US); Gerald Burt Kliman, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 09/749,062

(22) Filed: Dec. 27, 2000

(65) Prior Publication Data

US 2002/0079782 A1 Jun. 27, 2002

(51) Int. Cl.⁷ .............................. H02K 1/12; H02K 1/18
(52) U.S. Cl. ........................ 310/259; 310/258; 310/182
(58) Field of Search ................................. 310/258, 259, 310/197, 217, 182, 256

(56) References Cited

U.S. PATENT DOCUMENTS

| 3,987,325 | A | * | 10/1976 | Wilson et al. ............... 210/445 |
| 5,869,912 | A | | 2/1999 | Andrew et al. |
| 6,025,666 | A | | 2/2000 | Kliman |
| 6,104,116 | A | | 8/2000 | Fuller et al. |
| 6,127,761 | A | | 10/2000 | Shen et al. |

FOREIGN PATENT DOCUMENTS

JP    57-78334    *  5/1982   ............ H02K/1/18

* cited by examiner

Primary Examiner—Burton S. Mullins
(74) Attorney, Agent, or Firm—Banner & Witcoff, Ltd.

(57) ABSTRACT

A power generator that operates at a reduced keybar voltages and currents, flange currents, and keybar voltage differentials includes a keybar shield that reduces the amount of magnetic flux coupling into a keybar of multiple keybars during operation of the generator. By reducing the amount of coupled flux, the keybar shield reduces a keybar voltage and a keybar current in a keybar, reduces keybar current flowing into a flange, and reduces a voltage differential between voltages induced by the flux in the multiple keybars.

46 Claims, 12 Drawing Sheets

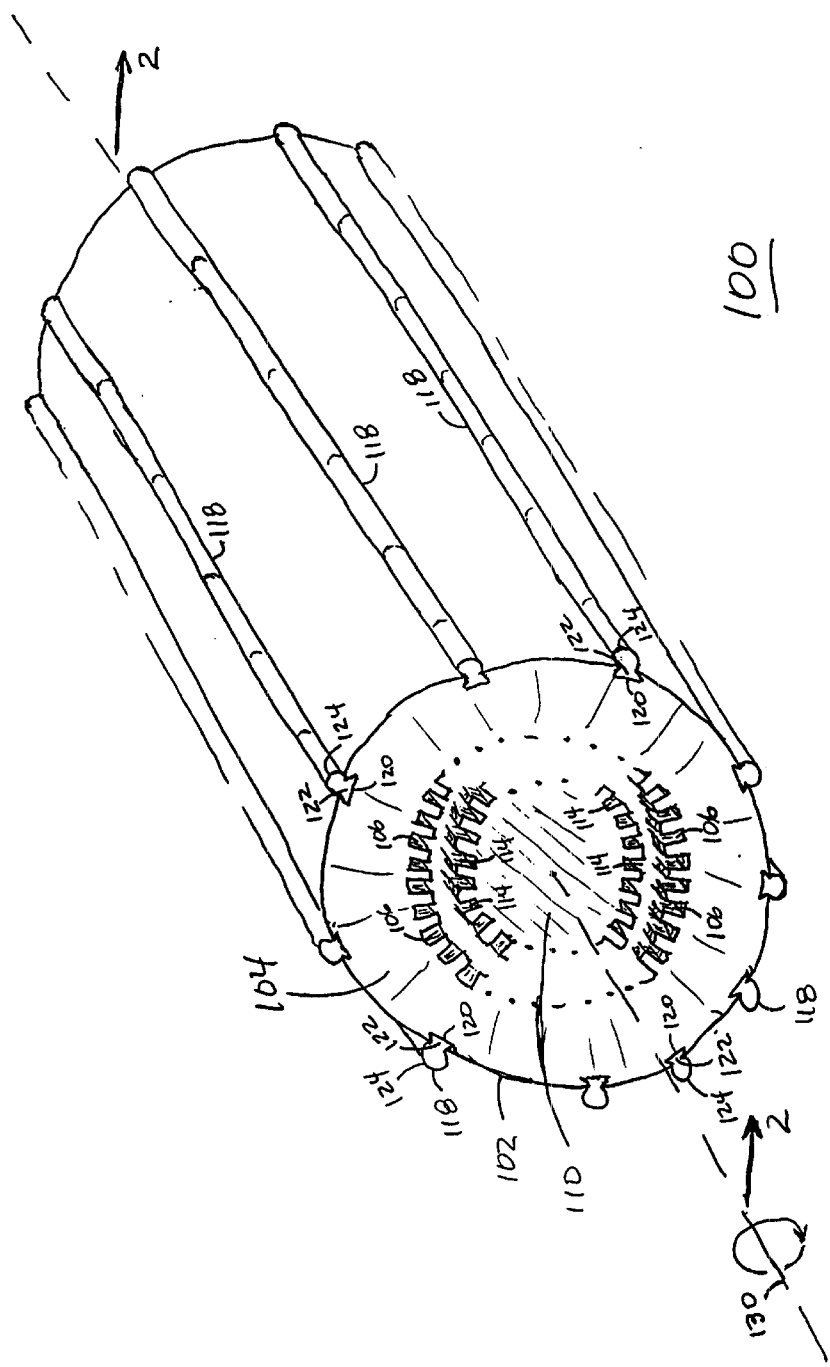
– PRIOR ART – FIG. 1

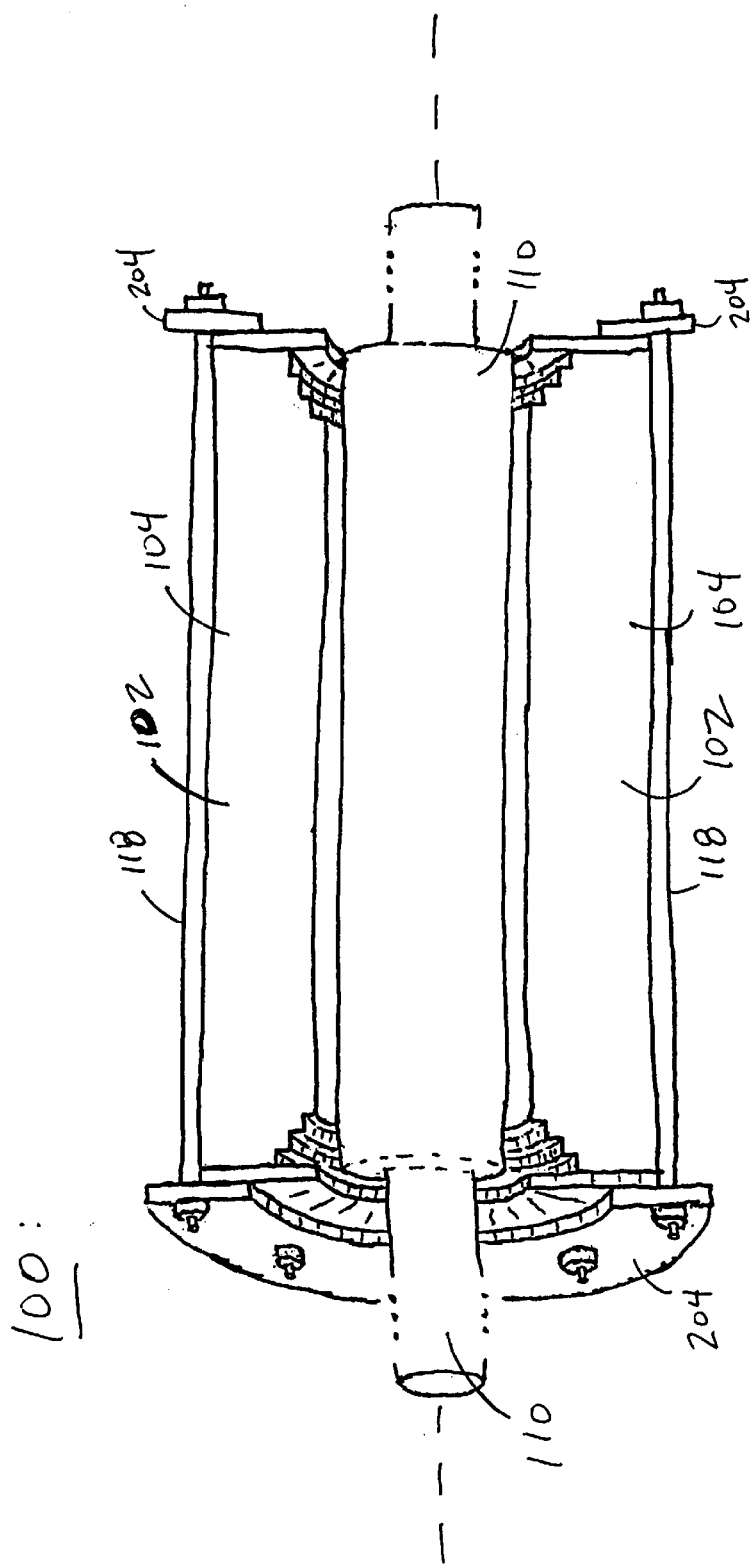

POWER GENERATOR

BACKGROUND OF THE INVENTION

The invention relates generally to a power generator, and in particular to reduction of keybar voltages in a power generator.

In order to improve generator efficiency and reduce generator size, generator manufacturers are constantly endeavoring to improve the thermal performance of the generator. For example, a prior art design of a high power electrical generator 100 is illustrated in FIGS. 1 and 2. FIG. 1 is an end view of a cross-section of generator 100 from an isometric perspective. FIG. 2 is a cut-away view of generator 100 along axis 2—2. As shown in FIGS. 1 and 2, electrical generator 100 includes a substantially cylindrical stator 102 housing a substantially cylindrical rotor 110. Power generator 100 further includes multiple axially oriented keybars 118 that are circumferentially distributed around an outer surface of the stator 102. Each keybar 118 is mechanically coupled to the outer surface of stator 102. Each keybar 118 is further mechanically coupled at each of a proximal end and a distal end to one of multiple flanges 204. The multiple keybars 118, together with the multiple flanges 204, form a keybar cage around stator 102.

An inner surface of stator 102 includes multiple stator slots 106 that are circumferentially distributed around an inner surface of stator 102. Each stator slot 106 is radially oriented and longitudinally extends approximately a full length of stator 102. Each stator slot 106 receives an electrically conductive stator winding (not shown).

Rotor 110 is rotatably disposed inside of stator 102. An outer surface of rotor 110 includes multiple rotor slots 114 that are circumferentially distributed around the outer surface of rotor 110. Each rotor slot 114 is radially oriented and longitudinally extends approximately a full length of rotor 110. An air gap exists between stator 102 and rotor 110 and allows for a peripheral rotation of rotor 110 about axis 130.

Each rotor slot 114 receives an electrically conductive rotor winding (not shown). Each rotor winding typically extends from a proximal end of rotor 110 to a distal end of the rotor in a first rotor slot 114, and then returns from the distal end to the proximal end in a second rotor slot 114, thereby forming a loop around a portion of the rotor. When a direct current (DC) voltage differential is applied across a rotor winding at the proximal end of rotor 110, an electrical DC current is induced in the winding. Similar to the rotor windings, each stator winding typically extends from a proximal end of stator 102 to a distal end of the stator in a first stator slot 106, and then returns from the distal end of the stator to the proximal of the stator in a second stator slot 106, thereby forming a stator winding loop.

FIG. 3 is a partial perspective of generator of 100 and illustrates a typical technique of constructing a stator core 104. As shown in FIG. 3, stator core 104 includes multiple ring-shaped laminations 402 that are stacked one on top of another in order to build up the core. One design of stator core 104 further includes subdividing each lamination 302 into multiple lamination segments 304. A radially outer surface of each lamination segment 304 includes at least one slot 120 (not shown in FIG. 3) that aligns with one of the multiple keybars 118. Each keybar in turn includes an outer side 124 and an inner, or locking, side 122 that mechanically mates with one of the multiple slots 120. Stator core 104 is then constructed by sliding each lamination segment 304, via one of the multiple slots 120, into the keybar cage formed by the multiple keybars 118. The coupling of each slot of the multiple slots 120 of a lamination segment 304 with a locking side 122 of a keybar 118 affixes each lamination segment in position in stator 102.

A rotation of rotor 110 inside of stator 102 when a DC current is flowing in the multiple windings of rotor 110 induces electromagnetic fields in, and a passage of magnetic flux through, stator 102. A portion of the magnetic flux passes completely through stator 102 and spills outside of the outer surface of stator 102, coupling into each of the multiple keybars 118. The coupling of magnetic flux into each of multiple keybars 118 can induce keybar voltages and keybar currents in each keybar. One possible result is a development of a voltage differential between keybar voltages produced in each of two different keybars 118. When adjacent keybars 118 are coupled to adjacent lamination segments, a voltage differential between the adjacent keybars 118 may also appear across the adjacent lamination segments. The voltage differential between adjacent lamination segments can cause arcing between the two segments, overheating in the stator core 104, and reduced generator performance.

Furthermore, the keybar currents induced in each keybar 118 flow from the keybar 118 to a flange 204 coupled to the keybar. A mechanical joint by which a keybar 118 is coupled to a flange 204 can be a poor electrical conductor that provides a high resistance path for the current. As a result, the joint can be a source of undesirable energy dissipation and heat generation in power generator 100, and is also a potential source of arcing and pitting in the power generator. Furthermore, a flow of keybar current in a magnetically and electrically resistive flange 204 results in undesirable energy and heat dissipation in the flange. To avoid overheating the joint and the flange 204 and potential arcing and pitting, a power generator such as power generator 100 sometimes must be operated at backed off levels of magnetic flux and output voltage, reducing the efficiency and rated power level of the power generator 100.

Therefore, a need exists for a method and apparatus for reducing keybar currents and keybar voltage differentials induced in each of the multiple keybars.

BRIEF SUMMARY OF THE INVENTION

Thus there is a particular need for a method and apparatus that reduces keybar currents and that reduces any voltage differential that may appear between keybars. Briefly, in accordance with an embodiment of the present invention, a keybar shield is provided for insertion adjacent to an outer surface of a stator and that extends approximately an axial length of the stator. The keybar shield reduces the amount of flux coupling into a keybar during operation of a power generator, reducing a keybar voltage and a voltage differential that may appear between keybars. Also, by reducing the amount of flux coupling into a keybar, the keybar shield also reduces keybar currents and flange currents and their associated energy losses.

BRIEF DESCRIPTION OF THE DRAWINGS

FIG. 1 is an isometric perspective of an end view of a cross-section of a power generator of the prior art.

DETAILED DESCRIPTION OF THE INVENTION

Figure 3:
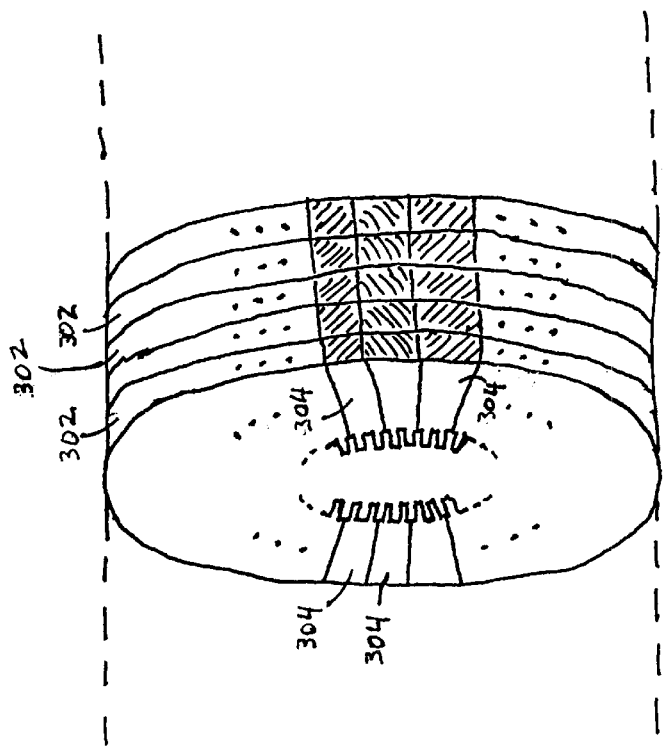
FIG. 3 is a partial perspective of the power generator of FIG. 1.
Figure 4:
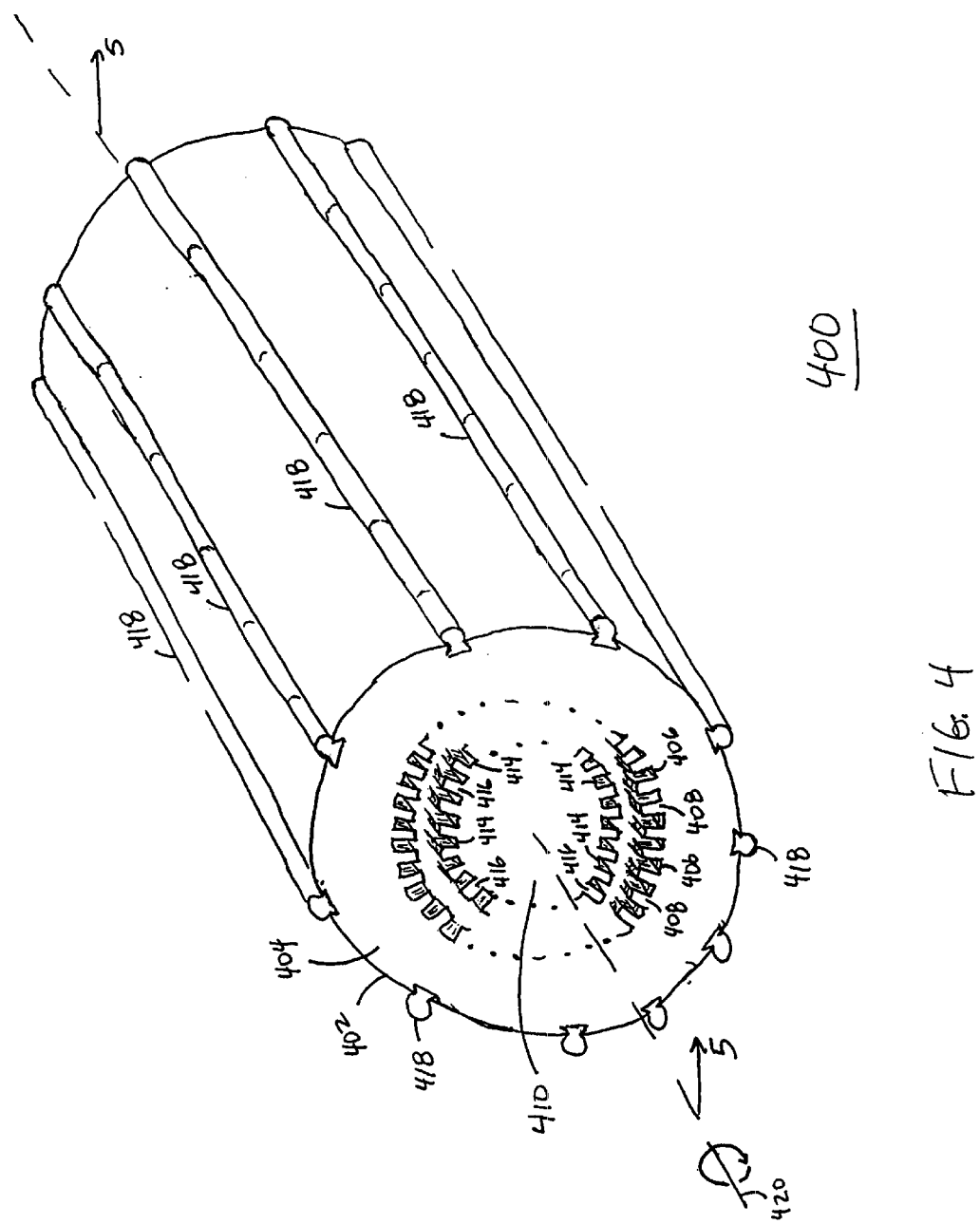
FIG. 4 is an end view of a cross-section of an exemplary power generator from an isometric perspective in accordance with an embodiment of the present invention.
Figure 5:
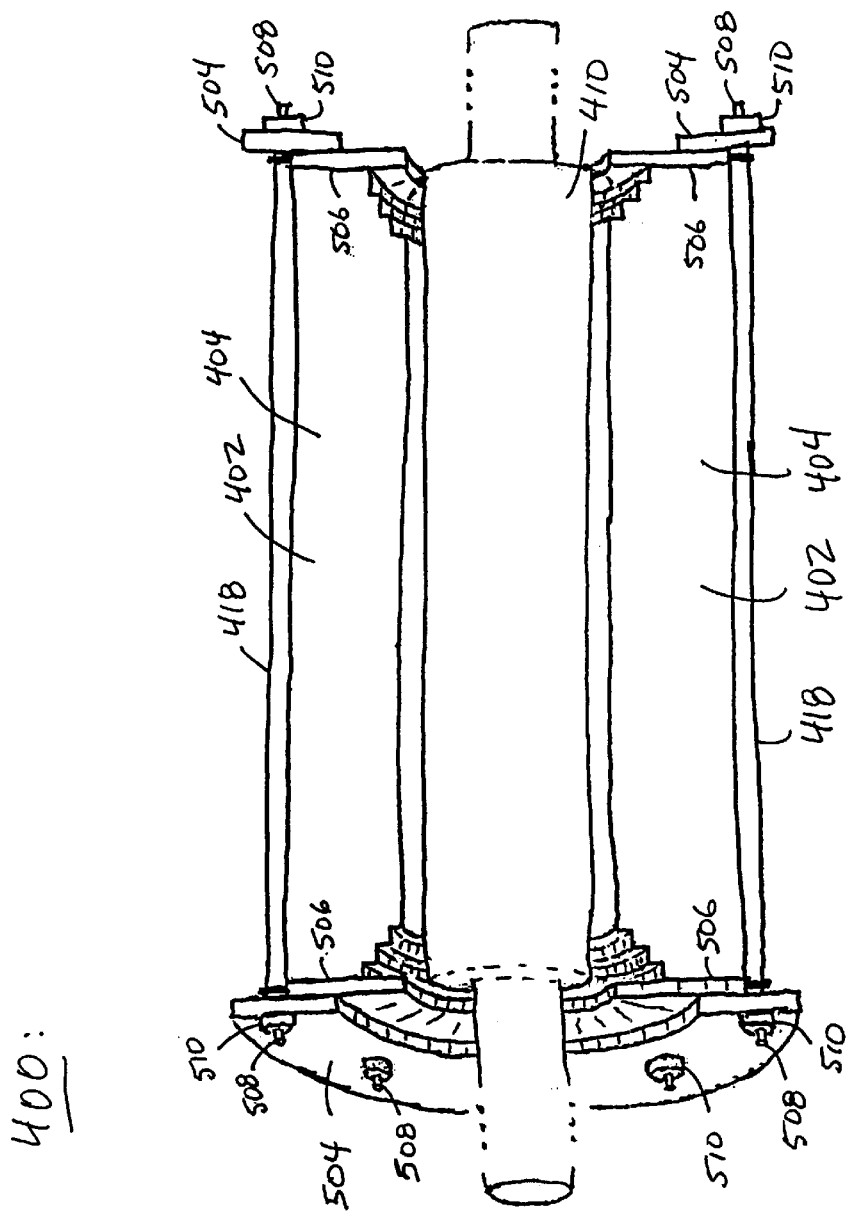
FIG. 5 is a cut-away view of the power generator of FIG. 4 along axis 5—5 in accordance with an embodiment of the present invention.

Referring now to FIGS. 4 and 5, an exemplary power generator 400 with reduced stator heating is illustrated. FIG. 4 is an end view of a cross-section of power generator 400 from an isometric perspective in accordance with an embodiment the present invention. FIG. 5 is a cut-away view of power generator 400 along axis 5—5 as shown in FIG. 4. As shown in FIGS. 4 and 5, power generator 400 includes a substantially cylindrical stator 402 having a stator core 404 and housing a substantially cylindrical rotor 410. Multiple circumferentially distributed and axially oriented keybars 418 are coupled together at each of a proximal end and a distal end by one of multiple flanges 504 (not shown in FIG. 4). Each keybar 418 is coupled to an outer surface of stator 402. The multiple keybars 418, together with the multiple flanges 504, form a keybar cage around the stator 402.

Similar to stator 102 of the prior art, an inner surface of stator 402 includes multiple stator slots 406 that are circumferentially distributed around the inner surface of the stator. Each stator slot 406 is axially oriented and extends approximately a full length of stator 402. Each stator slot 406 receives an electrically conductive stator winding (not shown). Between each pair of adjacent stator slots 406 is a stator tooth 408 that similarly is circumferentially distributed around the inner surface of stator 402 and extends approximately a full length of stator 402. Each stator tooth 408 is radially oriented and extends radially inward toward rotor 410 from stator 402.

Rotor 410 is rotatably disposed inside of stator 402. Similar to rotor 110 of the prior art, rotor 410 includes an outer surface that includes multiple rotor slots 414 that are circumferentially distributed around the outer surface of rotor 410. Each rotor slot 414 is radially oriented and extends approximately a full length of rotor 410. Between each pair of adjacent rotor slots 414 is a rotor tooth 416 that similarly is circumferentially distributed around the inner surface of rotor 410 and extends approximately a full length of rotor 410. Each rotor tooth 416 is radially oriented and extends radially outward toward stator 402 from rotor 410. An air gap exists between stator 402 and rotor 410 that allows for a peripheral rotation of rotor 410 about axis 420.

Similar to generator 100 of the prior art, each slot of the multiple rotor slots 414 receives an electrically conductive rotor winding (not shown) and each slot of the multiple stator slots 406 of generator 400 receives an electrically conductive stator winding (not shown). Each rotor winding typically extends from a proximal end of rotor 410 to a distal end of the rotor in a first rotor slot of the multiple rotor slots 414, and then returns from the distal end to the proximal end in a second rotor slot of the multiple rotor slots 414, thereby forming a loop around a portion of the rotor. Each stator winding typically extends from a proximal end of stator 402 to a distal end of the stator in a first stator slot of the multiple stator slots 406, and then returns from the distal end of the stator to the proximal end of the stator in a second stator slot of the multiple stator slots 406, thereby forming a loop inside of the stator.

The multiple flanges 504 are each disposed adjacent to an end of stator core 404. Disposed between each flange 504 and stator core 404 is an outside space block 506. Each of the multiple flanges 504 is a ring-shaped metallic material that includes multiple keybar stud apertures (not shown) for receiving a keybar stud 508. The apertures are circumferentially disposed around each flange 504 in positions that correspond to positions of keybars 418 around stator 402. Each end of each keybar 418 includes a threaded keybar stud 508 that extends axially outward from the end of the keybar. Each flange 504 is placed on an end of stator 402 and over the keybar studs 508 such that each stud extends through the flange via a corresponding keybar stud aperture. Each flange 504 is then fastened onto an end of stator 402 and the multiple keybars 418 by multiple threaded nuts 510 that are each screwed onto a correspondingly threaded keybar stud 508.

Figure 6:
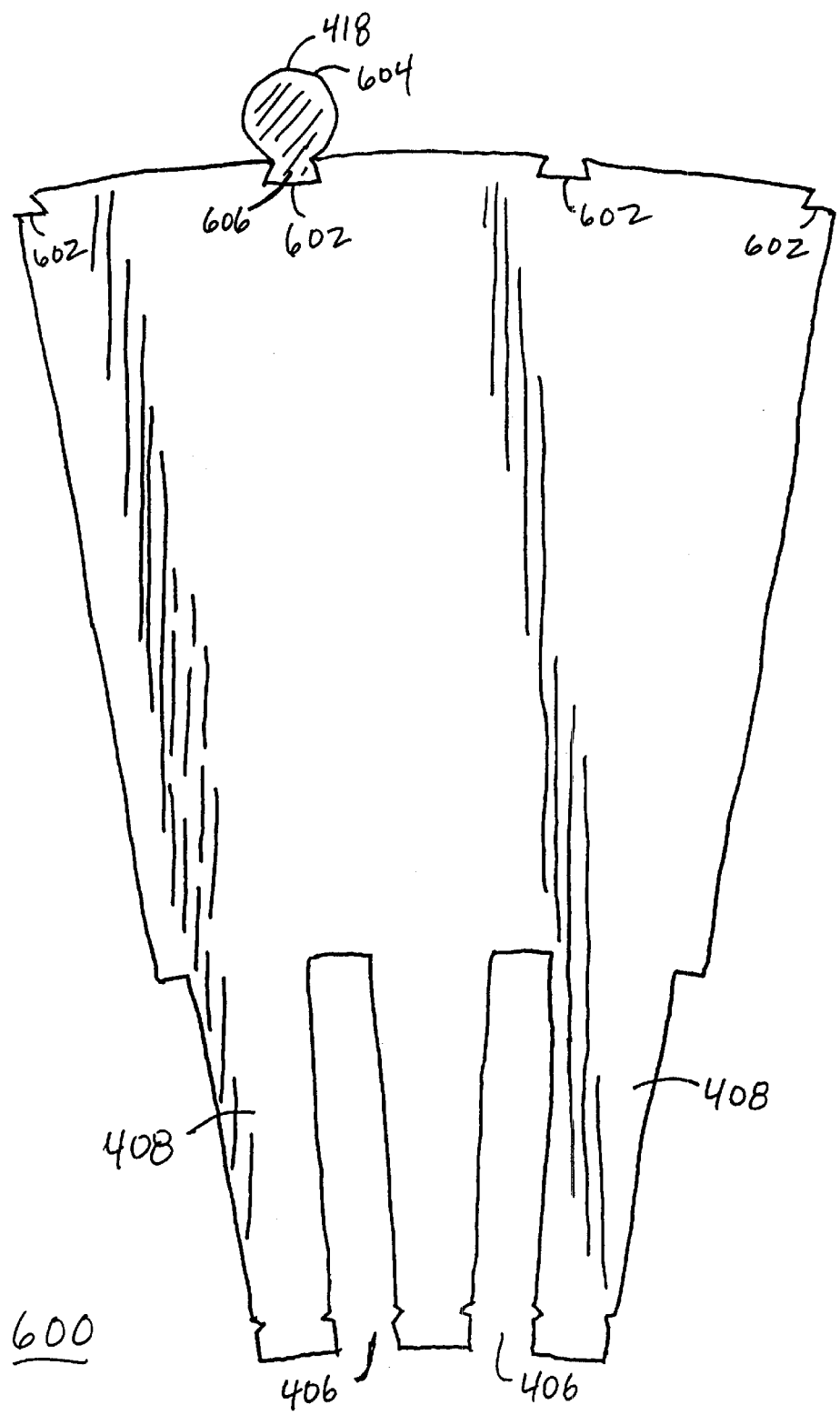
FIG. 6 is a top view of an exemplary lamination segment in accordance with an embodiment of the present invention.

Stator core 404 preferably includes multiple, stacked ring-shaped laminations, similar to stator core 104 of the prior art. Preferably, each ring-shaped lamination is subdivided into multiple lamination segments. FIG. 6 is an illustration of an exemplary lamination segment 600 in accordance with an embodiment of the present invention. As shown in FIG. 6, each lamination segment 600 of the multiple lamination segments includes multiple dovetail-shaped slots 602 in an outer edge of the segment for mechanically coupling the lamination segment to one or more keybars 418. In turn, each keybar 418 includes an outer side 604 and an inner, locking side 606. Locking side 606 includes a dovetail-shaped ridge that extends a length of the keybar 418 and that is designed to mate with a dovetail-shaped slot 602 of a lamination segment 600, thereby coupling each lamination segment 600 to a keybar 418. Multiple flanges 504 then hold the multiple keybars 418 and, in association with the keybars, the multiple ring-shaped laminations and the associated lamination segments in position in stator core 404.

Figure 7:
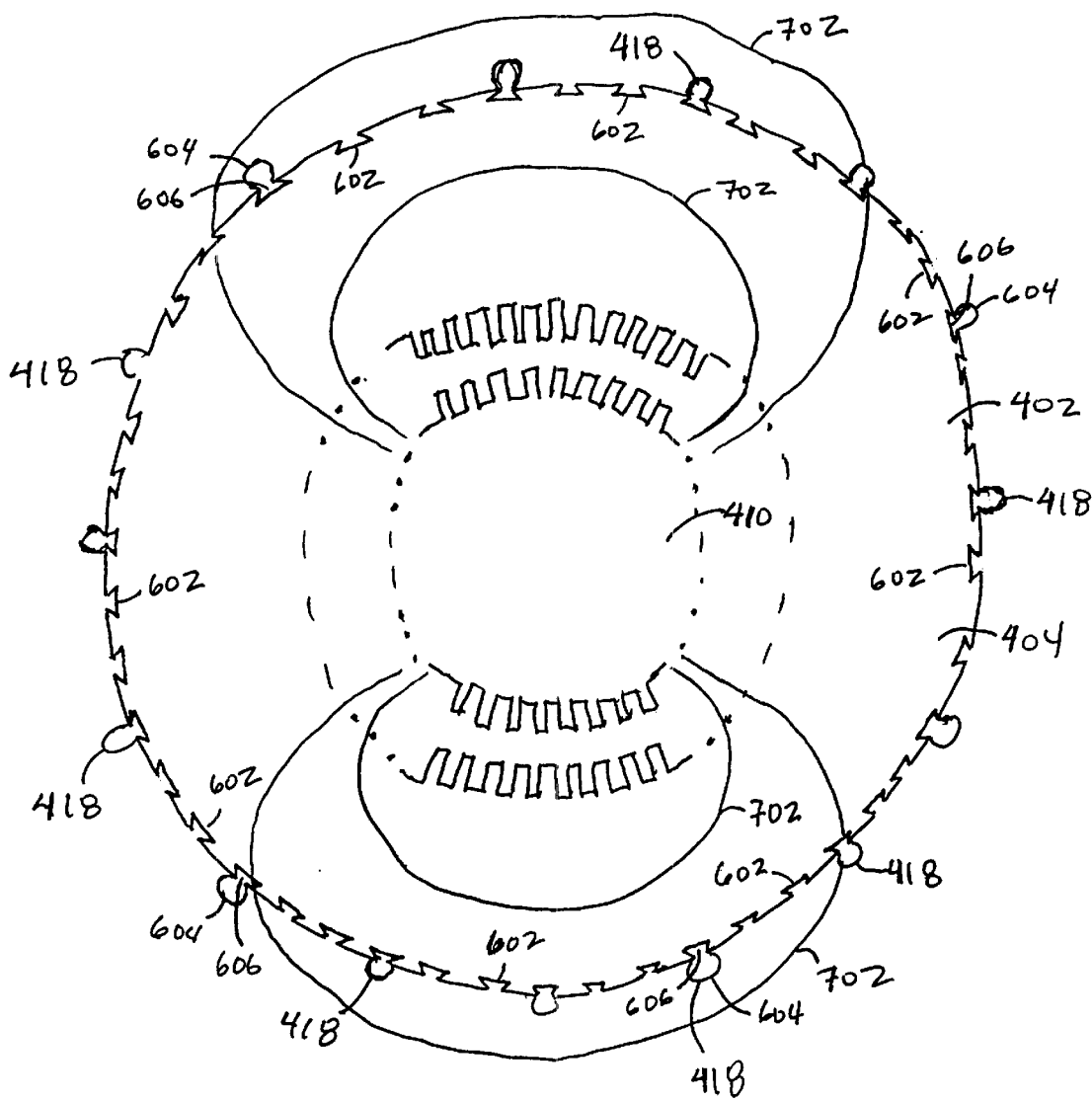
FIG. 7 is an end view of a cross section of the power generator of FIG. 4 in accordance with an embodiment of the present invention.

FIG. 7 is an end view of a cross-section of generator 400. As shown in FIG. 7, a rotation of rotor 410 inside of stator 402 when a DC current is flowing in the multiple windings of rotor 410 induces magnetic fields in, and a passage of magnetic flux 702 through, stator 402. A portion of the magnetic flux passes completely through stator 402 and spills outside of the outer surface of stator 402, coupling into each of the multiple keybars 418. The coupling of magnetic flux into each of multiple keybars 418 can induce keybar voltages and keybar currents in the keybar and a voltage differential between keybar voltages induced in each of two different keybars 418. In addition, keybar currents induced in each keybar 118 flow from the keybar 418 to a flange 504 coupled to the keybar via a potentially high resistance mechanical joint. In order to minimize undesirable effects of keybar voltage differentials, keybar currents, and flange currents, power generator 400 includes a keybar voltage and current reduction apparatus that reduces keybar voltages and keybar currents induced in a keybar 418 by a rotation of rotor 410.

Figure 8:
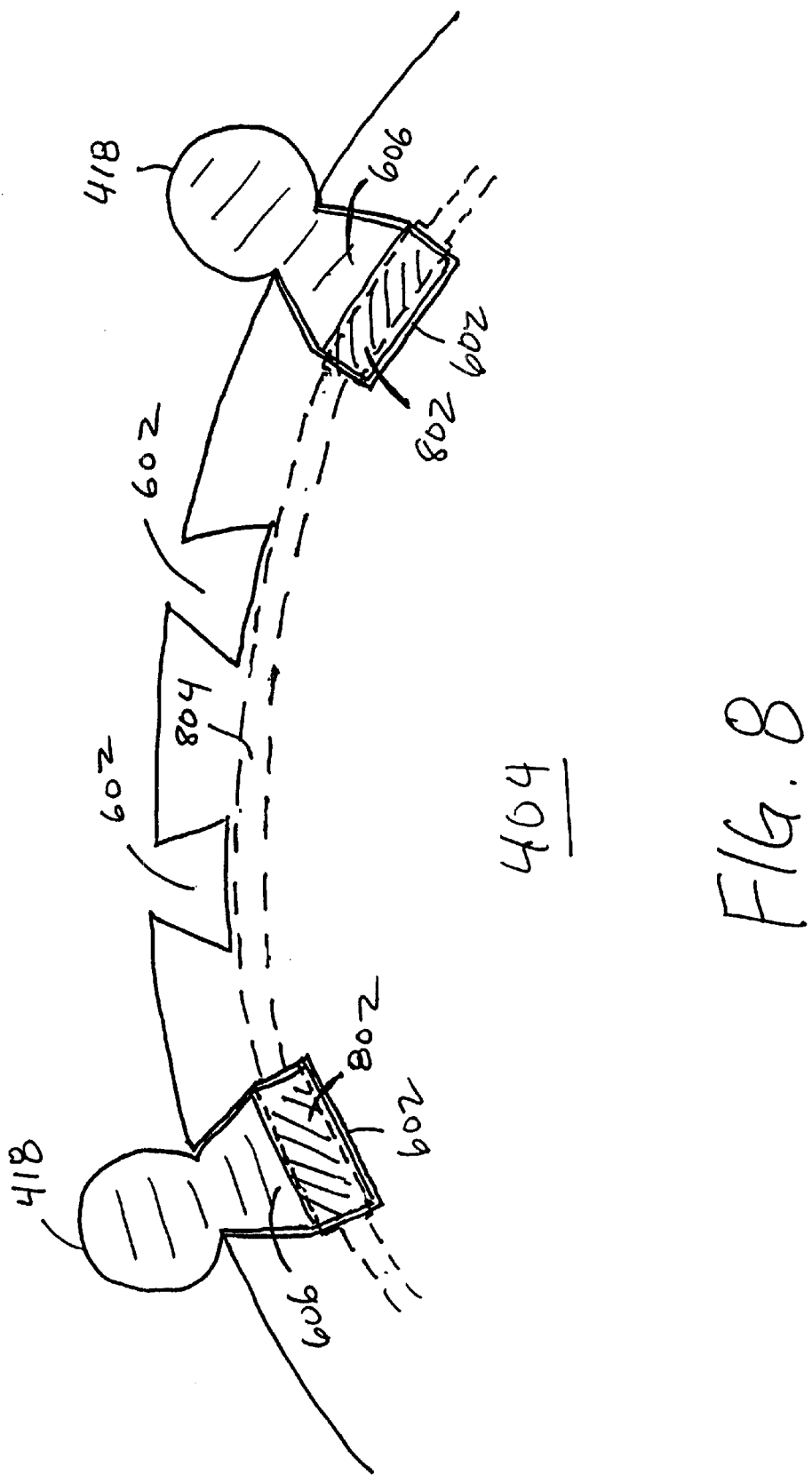
FIG. 8 is a partial end view of a cross section of the power generator of FIG. 4 in accordance with an embodiment of the present invention.
Figure 9:
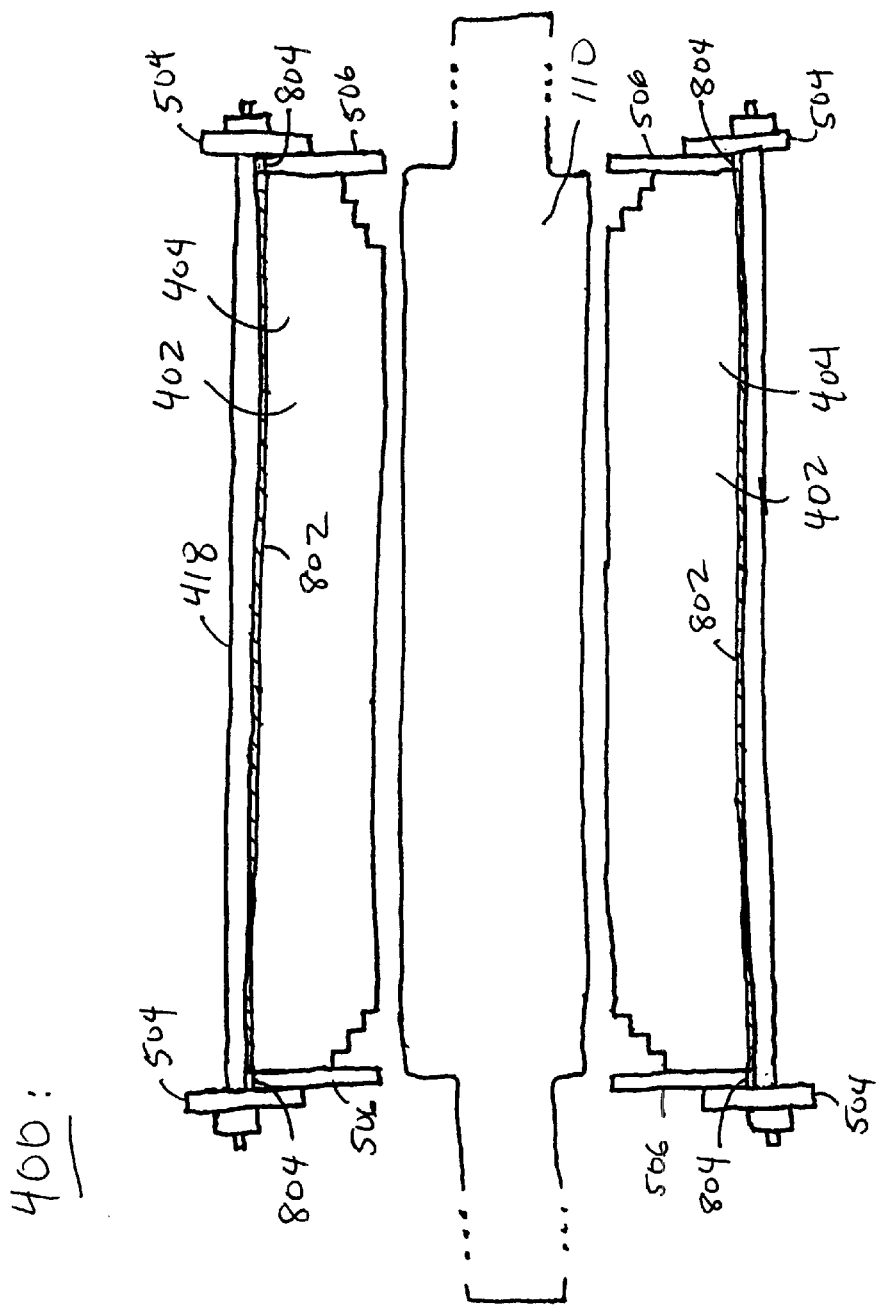
FIG. 9 is a side view of a cross section of the power generator of FIG. 4 in accordance with an embodiment of the present invention.

Referring to FIG. 8 and 9, a keybar voltage and current reduction apparatus is illustrated in accordance with an embodiment of the present invention. FIG. 8 is a partial end view of a cross section of a power generator 400 in accordance with an embodiment of the present invention. FIG. 9 is a side view of a cross section of a power generator 400 in accordance with an embodiment of the present invention. As shown in FIGS. 8 and 9, power generator 400 further includes multiple highly electrically conductive keybar shields 802 that are each coupled to at least one of multiple keybar shunts 804, thus forming a keybar shield cage. Each keybar shield of the multiple keybar shields 802 is an electrical conductor of a low electrical resistance, such as a strip of copper, a bar of copper, or a copper braid. Those who are of ordinary skill in the art realize that other materials of low electrical resistance may be used herein without departing form the spirit and scope of the present invention. Each keybar shield 802 is axially oriented and is disposed between a locking side 606 of a keybar and a slot 602 of stator core 404. In addition, a preferable length of each keybar shield 802 is approximately a entire axial length of stator core 404; however, those who are of ordinary skill in the art realize that keybar shields of other lengths may be used herein, or that a keybar shield may be divided into multiple discrete segments that are each less than a full length of the stator core, without departing from the spirit and scope of the present invention.

In power generator 400, magnetic flux that is generated by a rotation of rotor 410 and that spills outside of stator 402 couples to one or more keybar shields 802. By coupling the magnetic flux that spills outside of stator 402, each keybar shield 802 reduces the amount of magnetic flux that couples to a keybar 418 and reduces voltages and currents induced in the keybar by the flux. Similarly, the multiple keybar shields 802 reduce the amount of magnetic flux coupling to the multiple keybars 418, thereby also reducing magnetic flux-induced keybar voltages in the multiple keybars and reducing potential voltage differentials between the keybar voltages of different keybars. By reducing reducing potential keybar voltage differentials, the keybar shields 802 reduce the possibility of arcing and localized heating in stator 402.

Each keybar shield 802 is electrically coupled to the other keybar shields 802 at each of a proximal end and a distal end of the keybar shield by one of the multiple keybar shunts 804. In one embodiment, each keybar shunt 804 is an electrically conductive ring that is affixed to an end of each keybar shield 802. For example, a keybar shield 802 may be brazed to keybar shunt 804. By way of another example, each keybar shield 802 may further include a threaded keybar shield stud that extends axially outward from the end of the shield. Each keybar shunt 804 may then include multiple apertures that are each aligned with a keybar shield stud and that facilitate a bolting of each keybar shield 804 to the keybar shunt 804. Alternatively, each keybar shunt 804 may be any kind of electrically conductive link between the ends of the multiple keybar shields 802. As shown in FIG. 9, each keybar shunt 804 can be disposed between each of the keybars 418 and an outside space block 506 and adjacent to a flange 504. In alternative embodiments of the present invention, each keybar shunt 804 may be disposed between a space block 506 and stator core 404 or between the space block and a flange 506.

Figure 10:
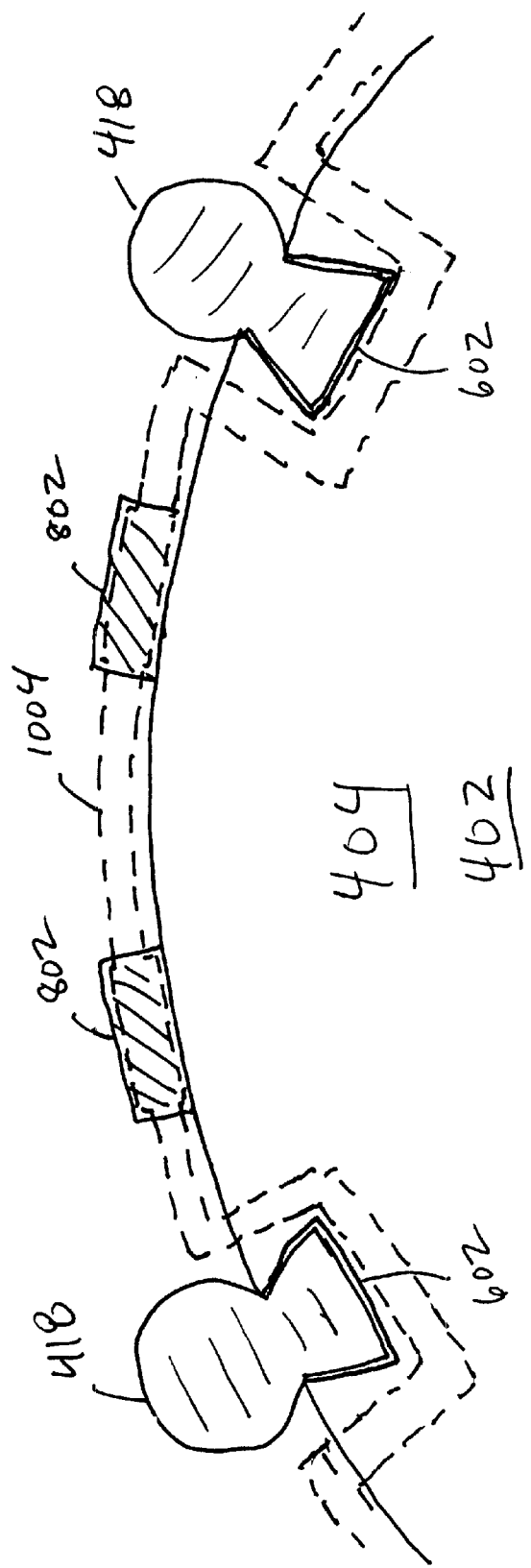
FIG. 10 is a partial end view of a cross section of a power generator in accordance with another embodiment of the present invention.

Referring now to FIG. 10, a keybar voltage and current reduction apparatus is illustrated in accordance with another embodiment of the present invention. As shown in FIG. 10, instead of being disposed in a stator slot 602, each keybar shield 802 may be disposed on an outer surface of the stator 402 outside of the slots. Similar to the keybar reduction apparatus of FIGS. 8 and 9, each keybar shield 802 is shorted at each of a proximal end and a distal end of the keybar shield by being electrically coupled to one of multiple keybar shunts 1004. Similar to multiple keybar shunts 804, each keybar shunt of the multiple keybar shunts 1004 is preferably approximately ring-shaped and includes a low resistance material in order to provide a low resistance electrical connection among each of the multiple keybar shields 802. The multiple keybar shields 802, in conjunction with the multiple keybar shunts 804, may then form a keybar shield cage that is parallel to the keybar cage. In addition, each keybar shield may be affixed to the to the outer surface of stator 402, for example by a high temperature adhesive or by a mechanical fastener. The width of keybar shield 802 may vary with the designer of power generator 400, and in yet another embodiment of the present invention, a keybar shield may be of a width that spans most of the distance along the outer surface of stator 402 between adjacent keybars 418. Preferably, a wider keybar shield 1002, such as the keybar shield that spans most the distance along the outer surface of stator 402 between adjacent keybars 418, will further include multiple apertures that permit a gaseous flow through the keybar shield, facilitating a temperature regulation of stator 402.

Figure 11:
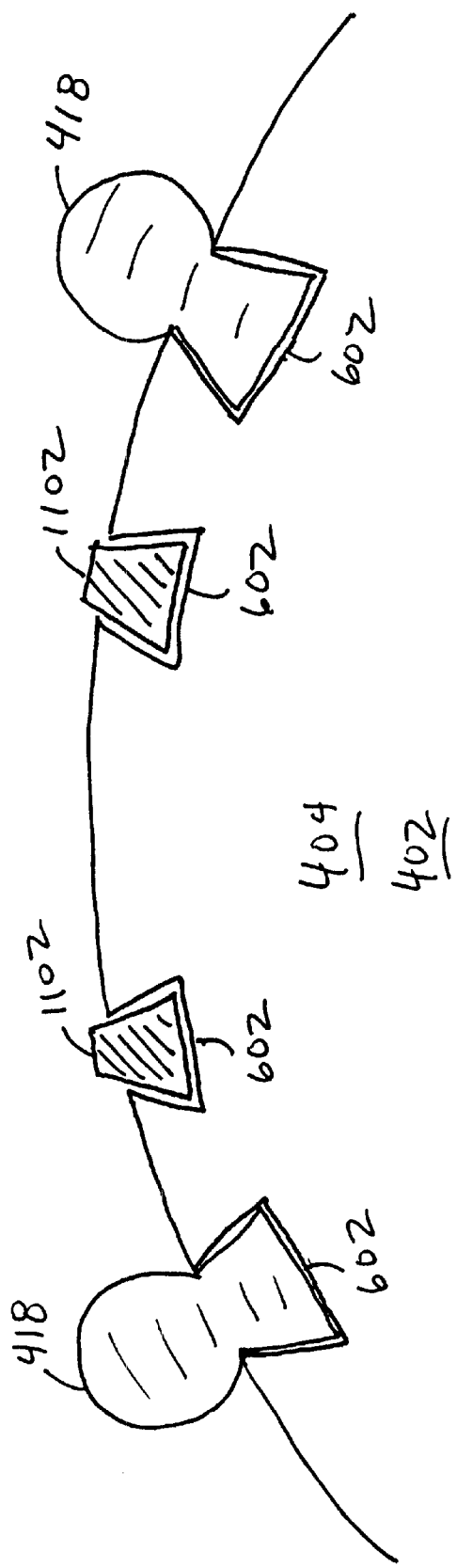
FIG. 11 is a partial end view of a cross section of a power generator in accordance with another embodiment of the present invention.

Referring now to FIG. 11, a keybar voltage and current reduction apparatus is illustrated in accordance with still another embodiment of the present invention. As shown in FIG. 11, each keybar shield 1102 of multiple keybar shields may be of a shape, preferably a dovetail shape, that mates with a shape of a slot 602 of stator 402. Each keybar shield 1102 is then disposed in one of the slots 602 of stator 402 that is not used by one of the multiple keybars 418. Similar to keybar shield 802, each keybar shield 1102 is an electrical conductor of a low electrical resistance, such as a bar of copper or a copper braid, and each keybar shield 1102 extends approximately an entire axial length of stator 402. In addition, and similar to the multiple keybar shields 802, each keybar shield 1102 is shorted at each of a proximal end and a distal end of the keybar shield by being electrically coupled to one of multiple keybar shunts, such as keybar shunt 1004.

By including multiple keybar shields that are each disposed adjacent to an outer surface of a power generator stator and that each extends approximately an entire axial length of the stator, the keybar voltage and current reduction apparatus reduces keybar voltages and currents, a keybar voltage differential, and an operating temperature of the power generator. Magnetic flux generated by a rotation of a power generator rotor is coupled to the keybar shields, reducing the amount of magnetic flux coupled to each of multiple keybars. By reducing the amount of flux coupled to each keybar, the keybar shield reduces keybar voltages and currents induced by the flux, thereby reducing potential voltage differentials between the keybar voltages and reducing the possibility of arcing and localized heating in the stator. Furthermore, by reducing the amount of flux coupled to each keybar, the keybar shield reduces the flow of keybar currents from the multiple keybars to a flange thereby reducing flange currents. By reducing keybar currents and flange currents, the keybar voltage and current reduction apparatus reduces heat and energy dissipation in the keybars, the flange, and the mechanical joints coupling the keybars to the flange.

Figure 12:
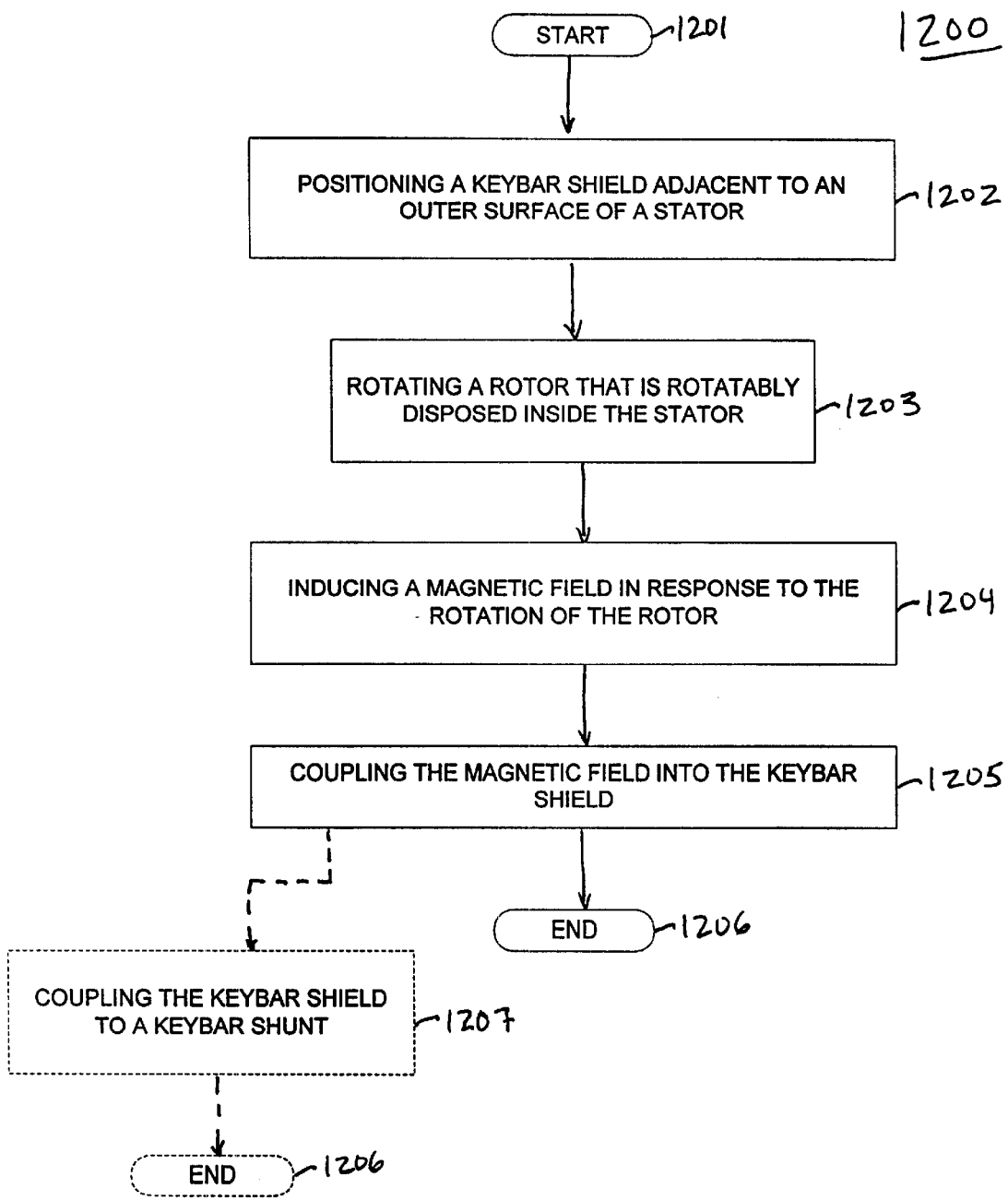
FIG. 12 is a logic flow diagram of steps executed in order to reduce keybar voltages and currents, flange currents, and keybar voltage differentials in a power generator in accordance with an embodiment of the present invention.
Figure 2:
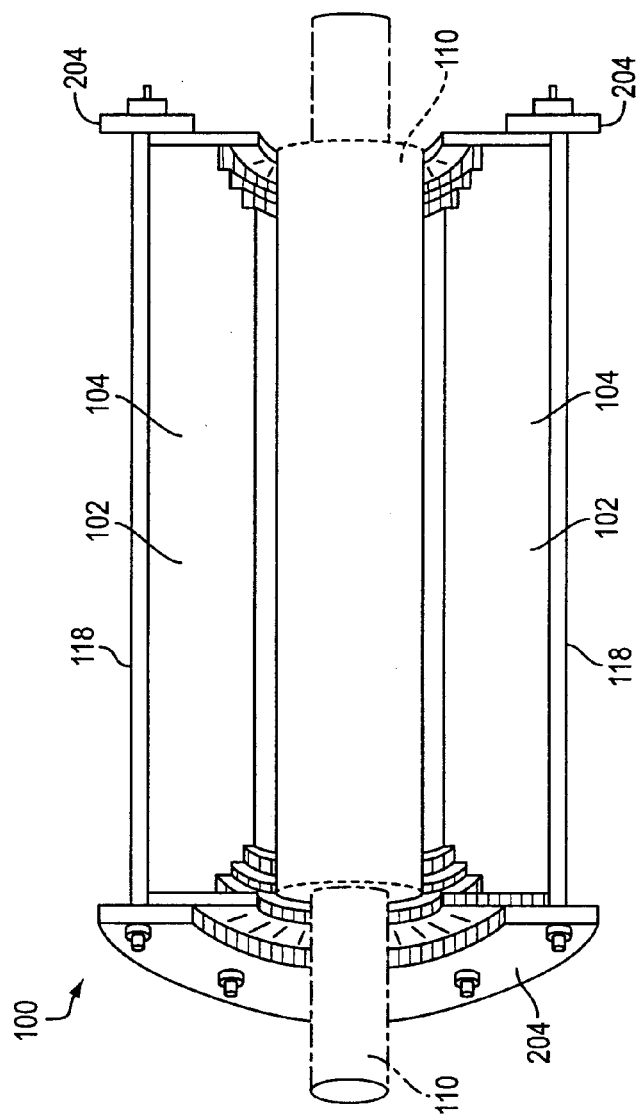
FIG. 2 is a cut-away view of the power generator of FIG. 1 along axis 2—2.
Figure 3:
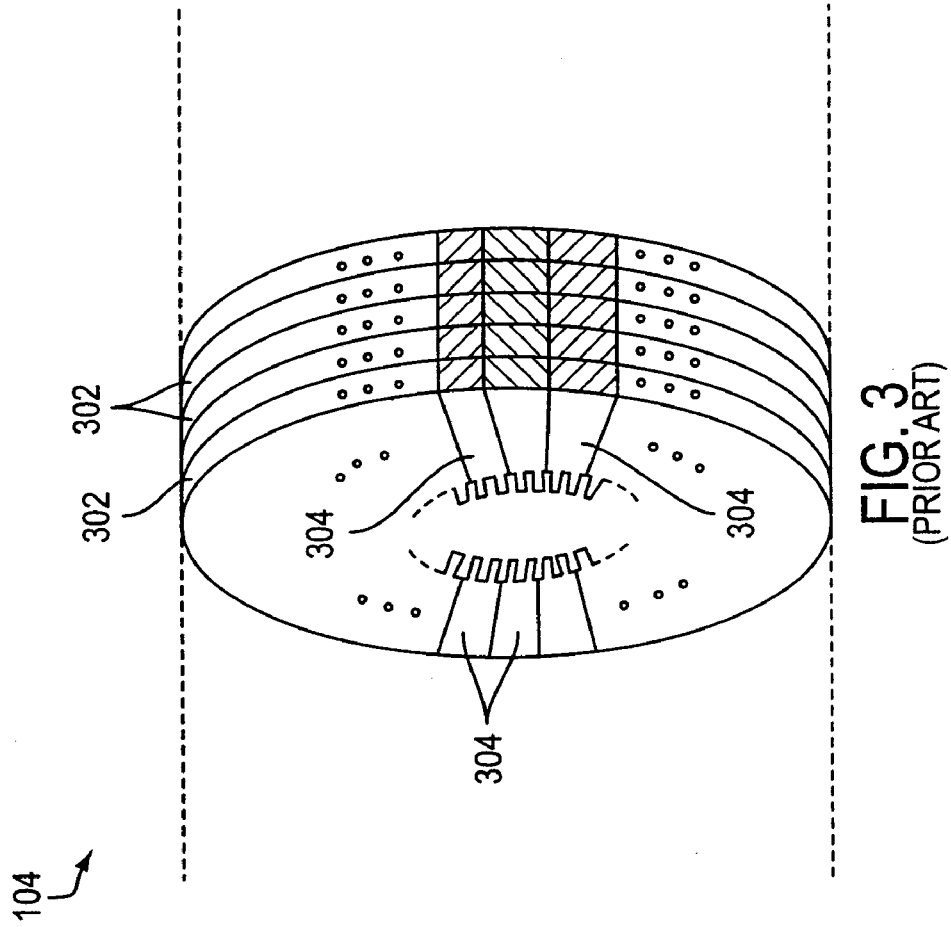
Figure 5:
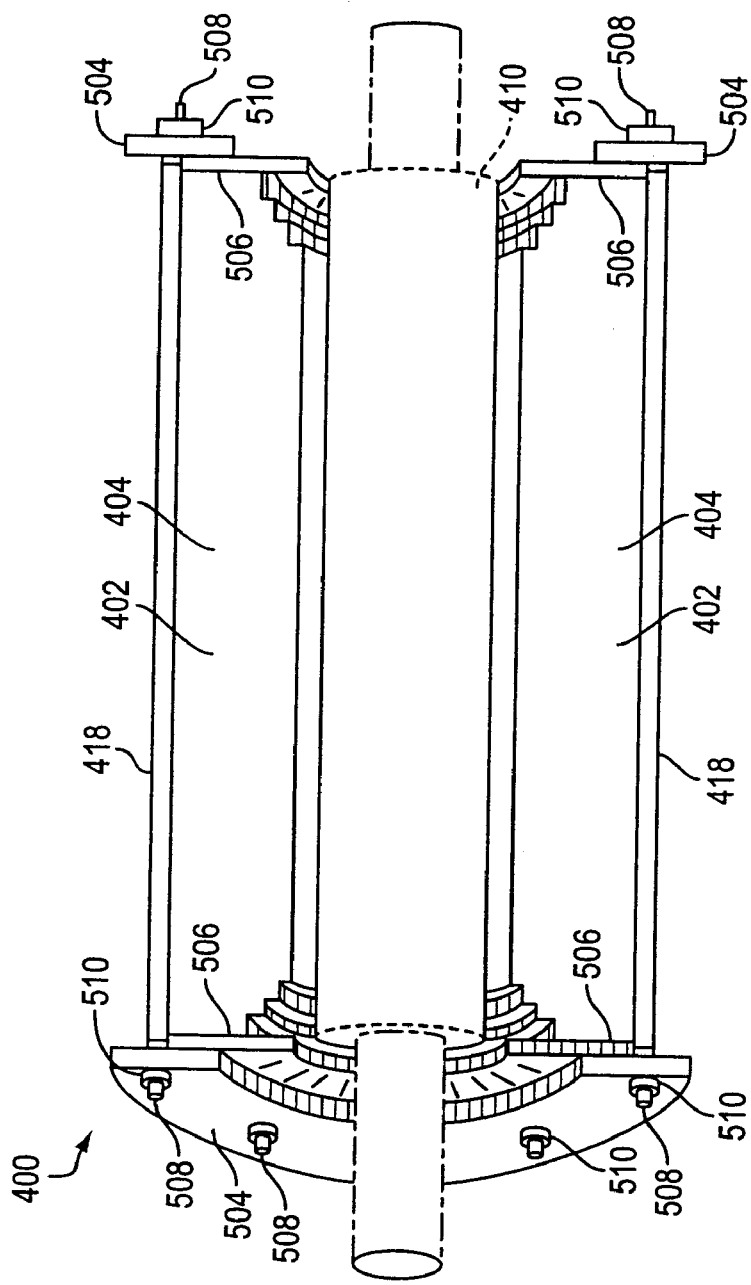
Figure 6:
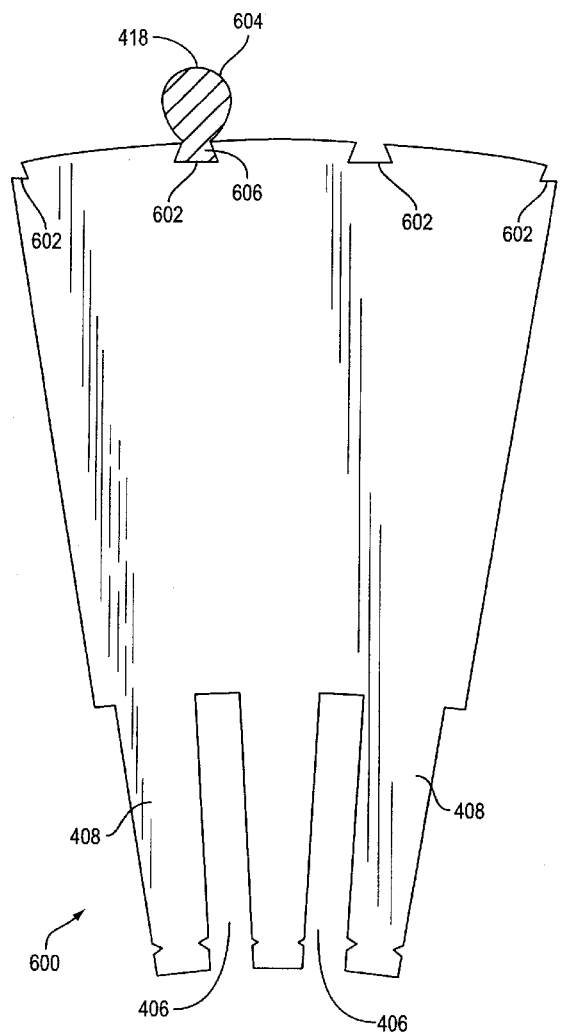
Figure 7:
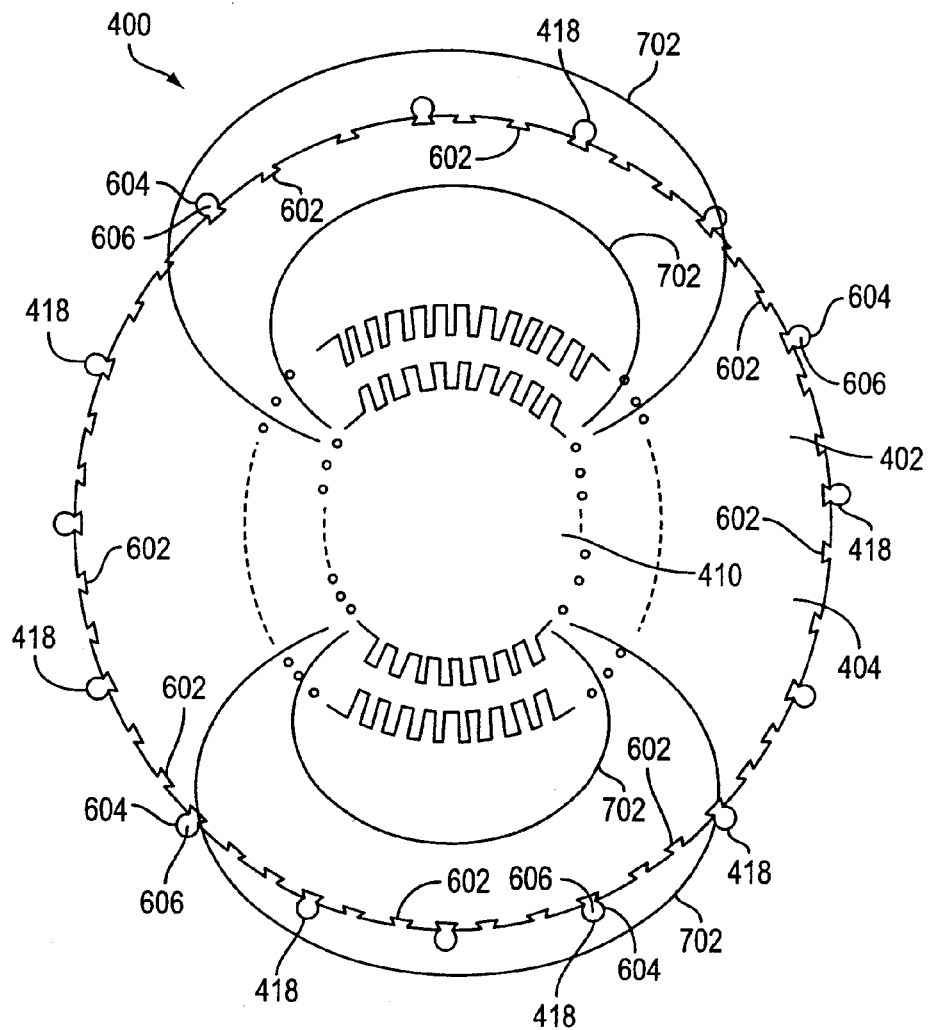
Figure 8:
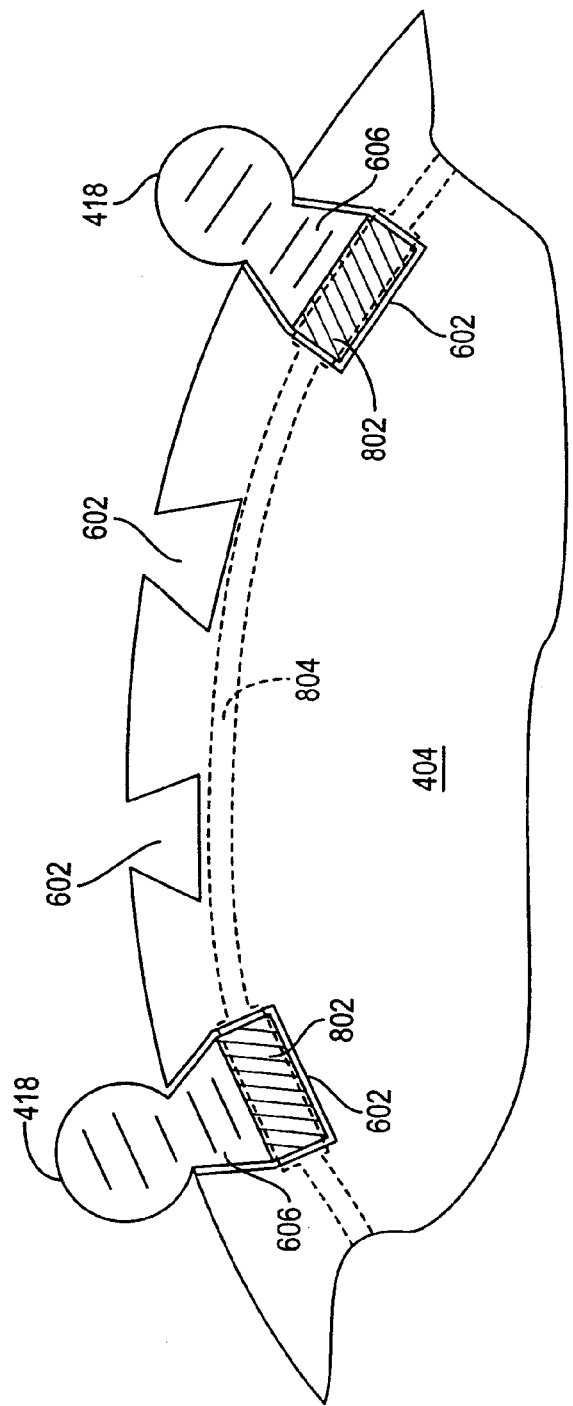
Figure 10:
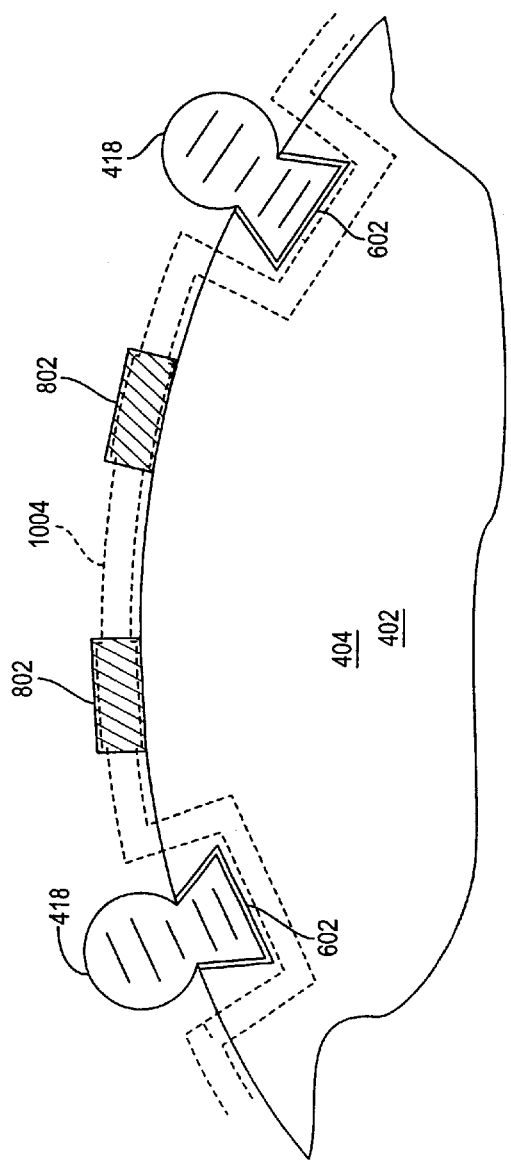
Figure 11:
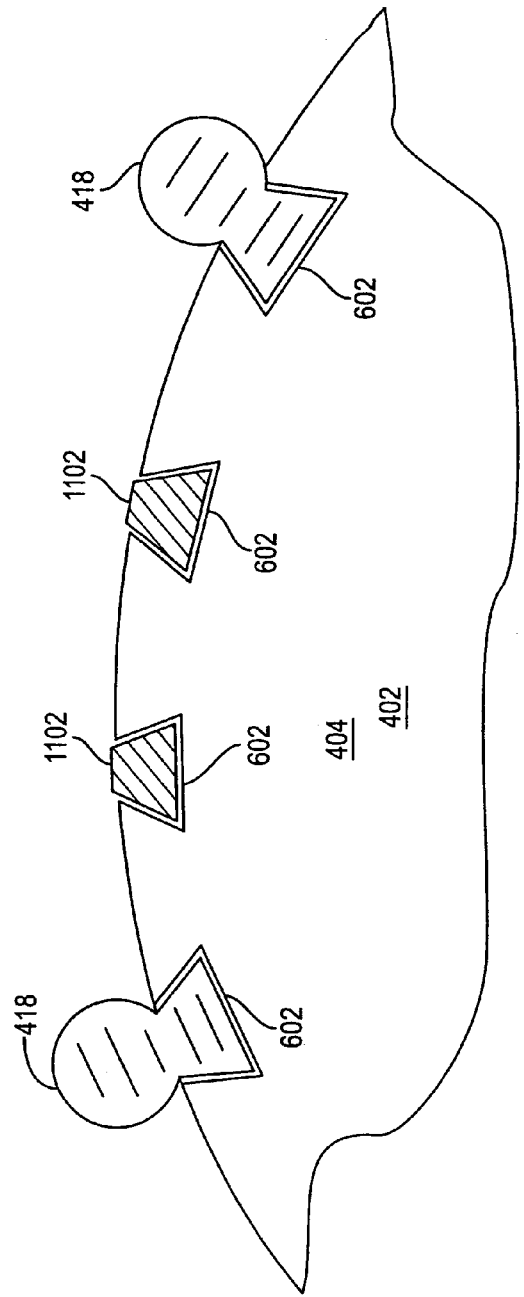
Figure 12:
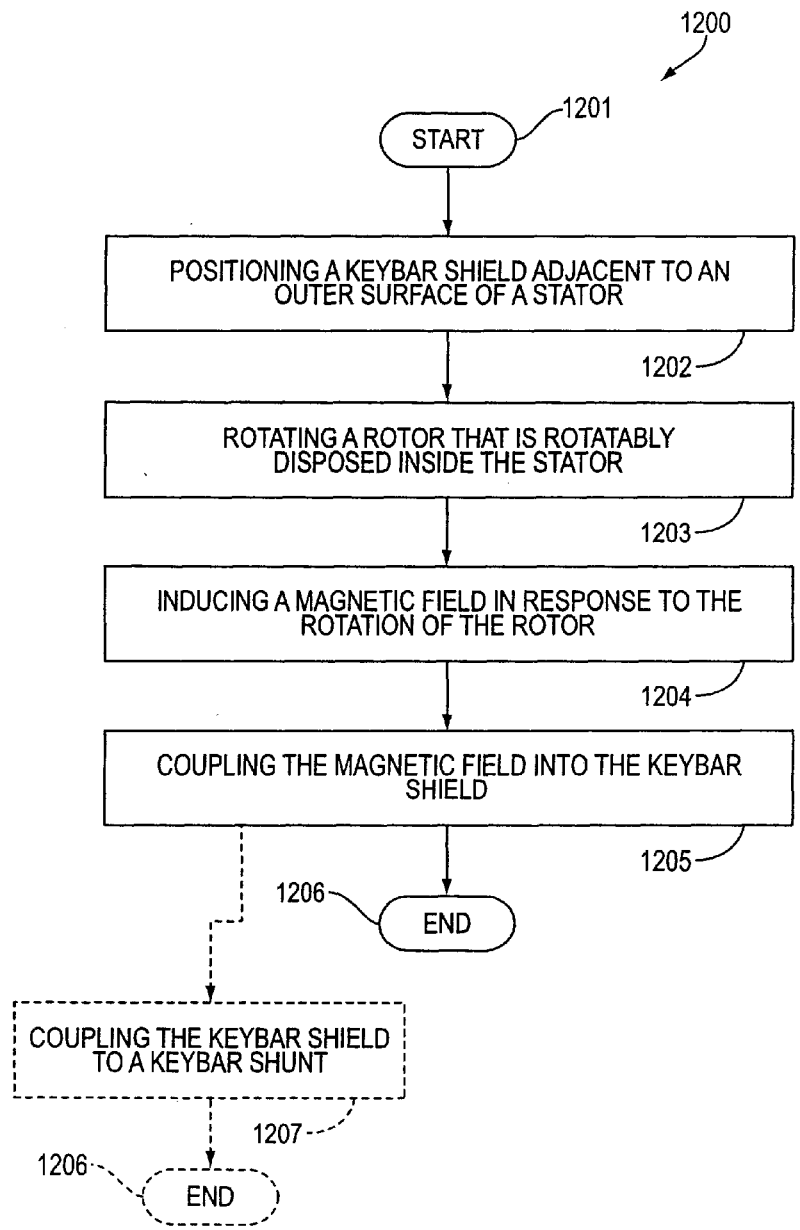

FIG. 12 is a logic flow diagram 1200 of a method for reducing keybar voltages and currents, flange currents, and keybar voltage differentials in a power generator in accordance with an embodiment of the present invention. Preferably, the power generator comprises an approximately cylindrical stator having an outer surface, a proximal end, a distal end, and a stator core. The power generator further comprises multiple keybars axially disposed adjacent to the outer surface of the stator and a rotor rotatably disposed inside of the stator. The logic flow diagram begins (1201) when a keybar shield is positioned (1202) adjacent to the outer surface of the stator. A rotating (1203) of the rotor induces (1204) a magnetic field, which magnetic field is coupled (1205) into the keybar shield and the logic flow ends (1206). By providing for a coupling of the magnetic field into the keybar shield, the keybar shield reduces the magnetic field coupled into a keybar, thereby reducing voltages and currents induced in the multiple keybars by the magnetic field and reducing a flow of keybar currents into the flanges. In addition, by reducing keybar voltages, potential keybar voltage differentials are reduced as well. In an alternative embodiment of the present invention, the method may further include a step of coupling (1207) the keybar shield to a keybar shunt.

In sum, a power generator is provided that includes multiple keybar shields, which keybar shields reduce the amount of flux coupling into each of multiple keybars during operation of a power generator. By reducing the amount of flux coupling into the keybars, the keybar shields permit the power generator to operate at a reduced temperature level, or alternatively to be driven harder in order to operate at the same temperature level. That is, by reducing the amount of flux coupling into the multiple keybars, the keybar shield reduces levels of keybar voltages and keybar currents induced by the flux and also reduces a potential voltage differential between voltages induced by the flux in each of the multiple keybars.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

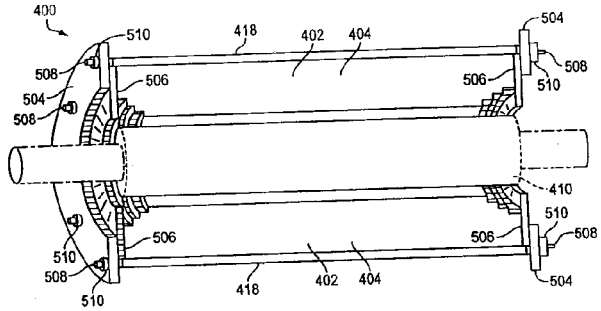

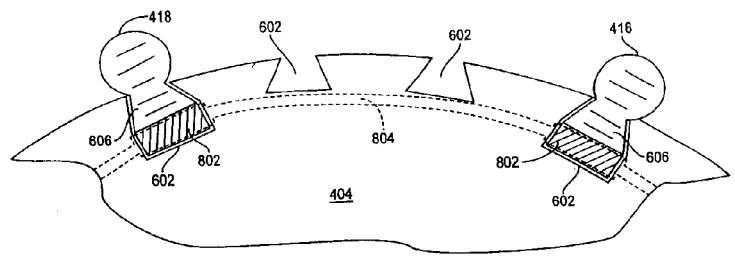

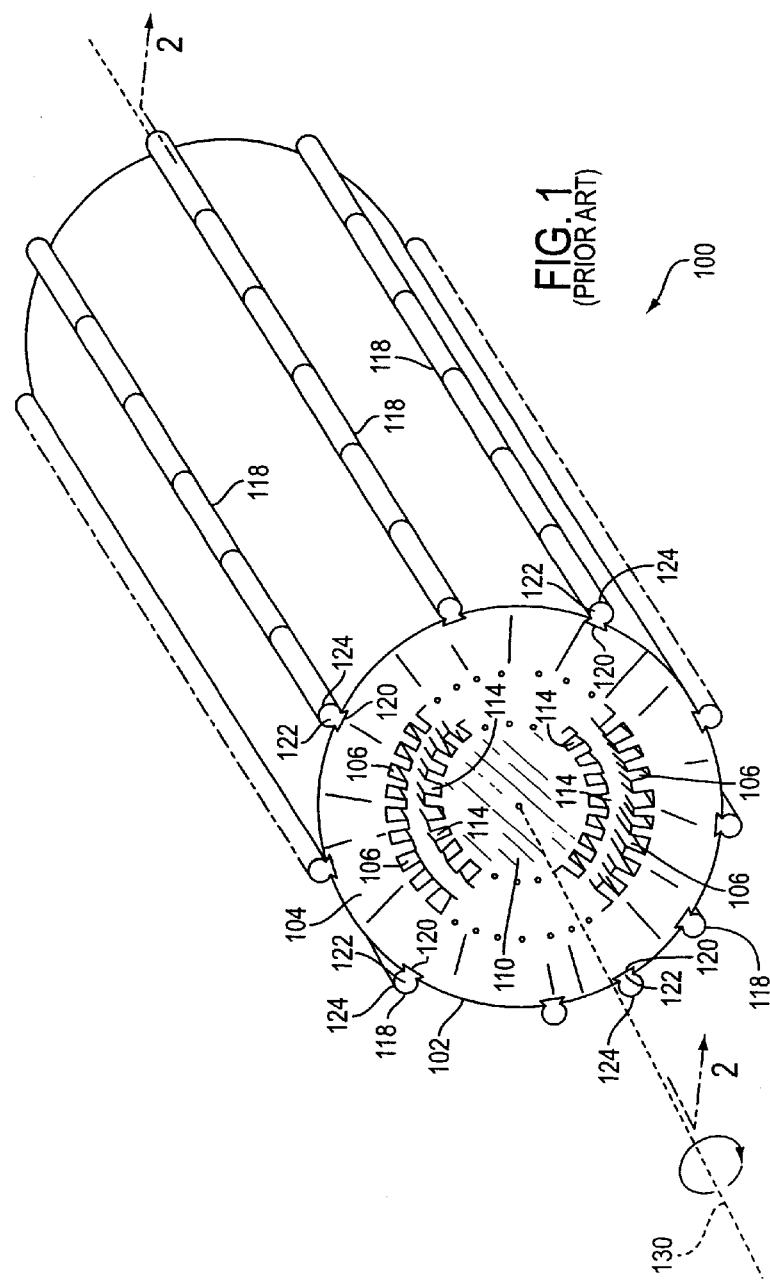

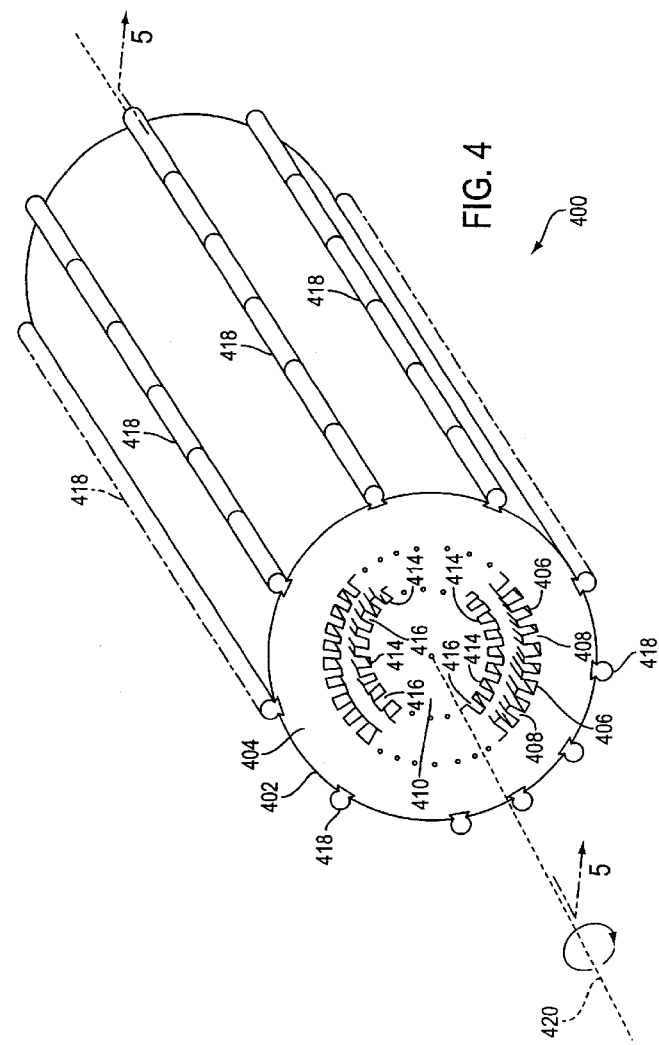

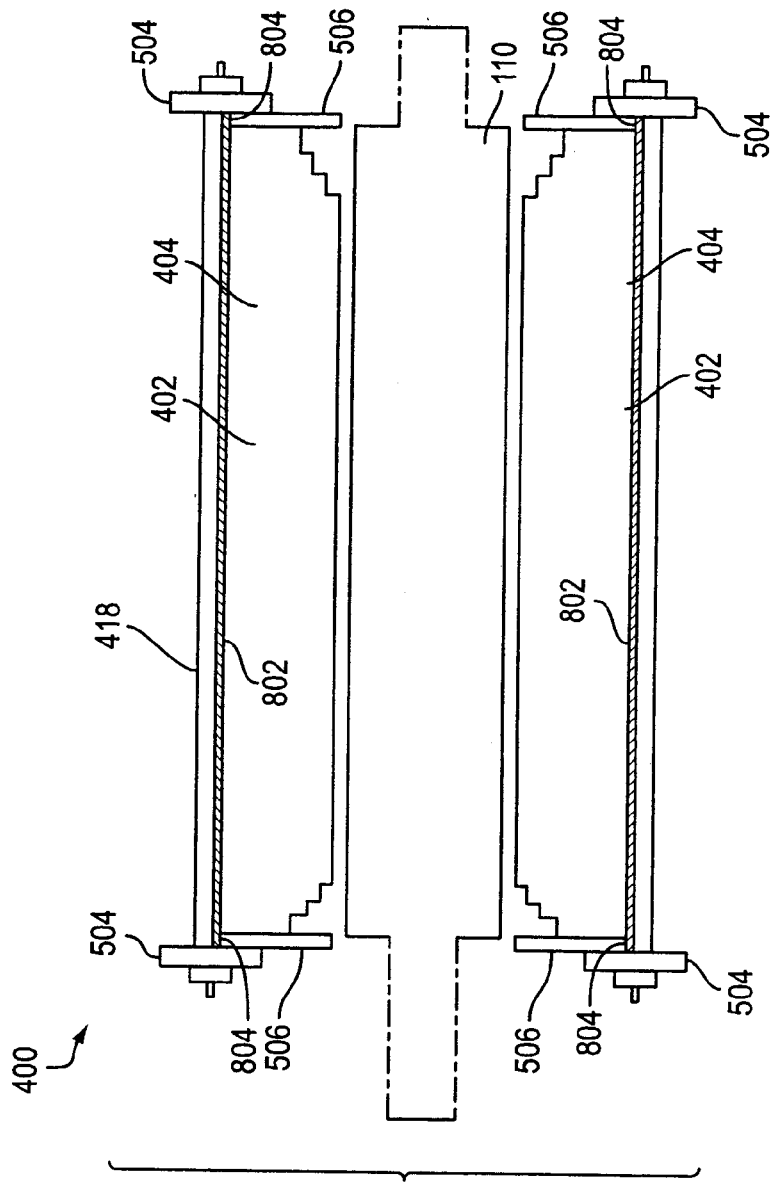

What is claimed is:

1. A keybar voltage and current reduction apparatus for use in a power generator comprising a stator having an outer surface and a stator core, the keybar voltage and current reduction apparatus comprising a plurality of keybar shields for the coupling of a magnetic field, wherein each keybar shield of the plurality of keybars shields is mechanically coupled to an outer surface of the stator and is disposed in a stator slot in the outer surface of the stator, which slot is designed for an insertion of a keybar, and wherein each keybar shield of the plurality of keybar shields is electrically coupled to another keybar shield of the plurality of keybar shields.

2. The keybar voltage and current reduction apparatus of claim 1, wherein a length of each keybar shield of the plurality of keybars shields is approximately an axial length of the stator core.

3. The keybar voltage and current reduction apparatus of claim 1, further comprising at least one keybar shunt that electrically couples at least one keybar shield of the plurality of keybar shields to another keybar shield of the plurality of keybars shields.

4. The keybar voltage and current reduction apparatus of claim 3, wherein the at least one keybar shunt couples the coupled keybar shields at an axial end of each coupled keybar shield.

5. The keybar voltage and current reduction apparatus of claim 4, wherein the at least one keybar shunt is disposed near an axial end of the stator core.

6. The keybar voltage and current reduction apparatus of claim 4, wherein the at least one keybar shunt comprises an electrically conductive ring.

7. The keybar voltage and current reduction apparatus of claim 4, wherein the at least one keybar shunt is coupled to each coupled keybar shield via a brazed connection.

8. The keybar voltage and current reduction apparatus of claim 1, wherein each keybar shield of the plurality of keybars shields is disposed between a keybar and the stator.

9. The keybar voltage and current reduction apparatus of claim 1, wherein each keybar shield of the plurality of keybar shields comprises an electrical conductor.

10. The keybar voltage and current reduction apparatus of claim 1, further comprising a keybar and wherein, when a magnetic field is applied to the keybar voltage and current reduction apparatus, the keybar shield couples a portion of a magnetic field that would be coupled to the keybar in the absence of the keybar shield.

11. The keybar voltage and current reduction apparatus of claim 1, wherein each keybar shield of the plurality of keybar shields comprises a plurality of discrete segments that are each less than a full length of the stator core.

12. The keybar voltage and current reduction apparatus of claim 1, wherein each keybar shield of the plurality of keybar shields comprises a dovetail shape and the corresponding stator slot for each keybar shield comprises an inverse dovetail shape for mating with the dovetail shape.

13. A keybar voltage and current reduction apparatus for use in a power generator comprising a stator having an outer surface and a stator core, the keybar voltage and current reduction apparatus comprising a plurality of keybar shields for the coupling of a magnetic field, wherein each keybar shield of the plurality of keybar shields is affixed to an outer surface of the stator by a high temperature adhesive, and wherein each keybar shield of the plurality of keybar shields is electrically coupled to another keybar shield of the plurality of keybar shields.

14. The keybar voltage and current reduction apparatus of claim 13, wherein a length of each keybar shield of the plurality of keybars shields is approximately an axial length of the stator core.

15. The keybar voltage and current reduction apparatus of claim 13, further comprising at least one keybar shunt that electrically couples at least one keybar shield of the plurality of keybar shields to another keybar shield of the plurality of keybars shields.

16. The keybar voltage and current reduction apparatus of claim 15, wherein the at least one keybar shunt couples the coupled keybar shields at an axial end of each coupled keybar shield.

17. The keybar voltage and current reduction apparatus of claim 16, wherein the at least one keybar shunt is disposed near an axial end of the stator core.

18. The keybar voltage and current reduction apparatus of claim 15, wherein the at least one keybar shunt comprises an electrically conductive ring.

19. The keybar voltage and current reduction apparatus of claim 15, wherein the at least one keybar shunt is coupled to each coupled keybar shield via a brazed connection.

20. The keybar voltage and current reduction apparatus of claim 13, wherein each keybar shield of the plurality of keybar shields comprises an electrical conductor.

21. The keybar voltage and current reduction apparatus of claim 13, further comprising a keybar and wherein, when a magnetic field is applied to the keybar voltage and current reduction apparatus, the keybar shield couples a portion of a magnetic field that would be coupled to the keybar in the absence of the keybar shield.

22. The keybar voltage and current reduction apparatus of claim 13, wherein each keybar shield of the plurality of keybar shields comprises a plurality of discrete segments that are each less than a full length of the stator core.

23. A power generator comprising:
a stator having an outer surface and a stator core;
a rotor rotatably disposed inside of the stator;
a plurality of keybars mechanically coupled to the outer surface of the stator;
at least one keybar shield mechanically coupled to an outer surface of the stator and disposed adjacent to the outer surface of the stator in a stator slot designed for an insertion of a keybar; and
wherein a rotation of the rotor induces a magnetic field that is coupled into the at least one keybar shield, and wherein a magnetic field that is coupled into a keybar of the plurality of keybars is less a magnetic field that would be coupled into the keybar in the absence of the at least one keybar shield.

24. The power generator of claim 23, wherein a length of the at least one keybar shield is approximately an axial length of the stator core.

25. The power generator of claim 23, wherein the at least one keybar shield comprises a plurality of keybar shields, and wherein the power generator further comprises at least one keybar shunt that couples at least one keybar shield of the plurality of keybar shields to another keybar shield of the plurality of keybar shields.

26. The power generator of claim 25, wherein the at least one keybar shunt couples the keybar shields at an axial end of each coupled keybar shield.

27. The power generator of claim 26, wherein the at least one keybar shunt is disposed near an axial end of the stator core.

28. The power generator of claim 25, wherein the at least one keybar shunt comprises an electrically conductive ring.

29. The power generator of claim 25, wherein the at least one keybar shunt is coupled to each coupled keybar shield via a brazed connection.

30. The power generator of claim 23, wherein each keybar shield of the plurality of keybar shields comprises a plurality of discrete segments that are each less than a full length of the stator core.

31. The power generator of claim 23, wherein each keybar shield of the plurality of keybar shields comprises a dovetail shape and the corresponding stator slot for each keybar shield comprises an inverse dovetail shape for mating with the dovetail shape.

32. The power generator of claim 23, wherein the at least one keybar shield is disposed between a keybar and the stator.

33. The power generator of claim 23, wherein the at least one keybar shield is an electrical conductor.

34. A power generator comprising:
a stator having an outer surface and a stator core;
a rotor rotatably disposed inside of the stator;
a plurality of keybars mechanically coupled to the outer surface of the stator;
at least one keybar shield affixed to an outer surface of the stator by a high temperature adhesive; and
wherein a rotation of the rotor induces an magnetic field that is coupled into the at least one keybar shield, and wherein a magnetic field that is coupled into a keybar of the plurality of keybars is less a magnetic field that would be coupled into the keybar in the absence of the at least one keybar shield.

35. The power generator of claim 34, wherein a length of the at least one keybar shield is approximately an axial length of the stator core.

36. The power generator of claim 34, wherein the at least one keybar shield comprises a plurality of keybar shields, and wherein the power generator further comprises at least one keybar shunt that couples at least one keybar shield of the plurality of keybar shields to another keybar shield of the plurality of keybar shields.

37. The power generator of claim 36, wherein the at least one keybar shunt couples the coupled keybar shields at an axial end of each coupled keybar shield.

38. The power generator of claim 37, wherein the at least one keybar shunt is disposed near an axial end of the stator core.

39. The power generator of claim 36, wherein the at least one keybar shunt comprises an electrically conductive ring.

40. The power generator of claim 36, wherein the at least one keybar shunt is coupled to the coupled keybar shields via a brazed connection.

41. The power generator of claim 34, wherein the at least one keybar shield is an electrical conductor.

42. The power generator of claim 34, wherein each keybar shield of the plurality of keybar shields comprises a plurality of discrete segments that are each less than a full length of the stator core.

43. A method for reducing keybar voltages and currents, flange currents, and keybar voltage differentials in a power generator comprising an approximately cylindrical stator having an outer surface and a stator core, a rotor rotatably disposed inside of the stator, a plurality of keybars axially disposed adjacent to the outer surface of the stator, and a flange coupled to each keybar of the plurality of keybars, the method comprising steps of:
mechanically coupling a keybar shield adjacent to the outer surface of the stator in a stator slot designed for an insertion of a keybar;
rotating the rotor;
inducing a magnetic field in response to the rotation of the stator; and
coupling the magnetic field into the keybar shield.

44. The method of claim 43, further comprising a step of coupling the keybar shield to a keybar shunt.

45. A method for reducing keybar voltages and currents, flange currents, and keybar voltage differentials in a power generator comprising an approximately cylindrical stator having an outer surface and a stator core, a rotor rotatably disposed inside of the stator, a plurality of keybars axially disposed adjacent to the outer surface of the stator, and a flange coupled to each keybar of the plurality of keybars, the method comprising steps of:

affixing a keybar shield adjacent to the outer surface of the stator by a high temperature adhesive;

rotating the rotor;

inducing a magnetic field in response to the rotation of the stator; and coupling the magnetic field into the keybar shield.

46. The method of claim 45, further comprising a step of coupling the keybar shield to a keybar shunt.

* * * * *

UNITED STATES PATENT AND TRADEMARK OFFICE
CERTIFICATE OF CORRECTION

PATENT NO.     : 6,462,457 B2
DATED          : October 8, 2002
INVENTOR(S)    : Manoj Ramprasad Shah et al.

It is certified that error appears in the above-identified patent and that said Letters Patent is hereby corrected as shown below:

The title page, showing the illustrative figure should be replaced with the attached title page.

In the drawings, Sheets 1-12 consisting of Figs. 1-12 should be replaced with Sheets 1-12 consisting of the correct Figs. 1-12, as shown on the attached pages.

Signed and Sealed this

Twenty-fourth Day of June, 2003

JAMES E. ROGAN
*Director of the United States Patent and Trademark Office*

(12) United States Patent
Shah et al.

(10) Patent No.: US 6,462,457 B2
(45) Date of Patent: Oct. 8, 2002

(54) POWER GENERATOR

(75) Inventors: Manoj Ramprasad Shah, Latham, NY (US); Sameh Ramadan Salem, Rexford, NY (US); Ronald Irving Longwell, Ballston Lake, NY (US); Patrick Lee Jansen, Alplaus, NY (US); Gerald Burt Kliman, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 09/749,062

(22) Filed: Dec. 27, 2000

(65) Prior Publication Data

US 2002/0079782 A1 Jun. 27, 2002

(51) Int. Cl.[7] .............................. H02K 1/12; H02K 1/18
(52) U.S. Cl. .................. 310/259; 310/258; 310/182
(58) Field of Search .................................. 310/258, 259, 310/197, 217, 182, 256

(56) References Cited

U.S. PATENT DOCUMENTS

| | | | |
|---|---|---|---|
| 3,987,325 A | * | 10/1976 | Wilson et al. ............... 210/445 |
| 5,869,912 A | | 2/1999 | Andrew et al. |
| 6,025,666 A | | 2/2000 | Kliman |
| 6,104,116 A | | 8/2000 | Fuller et al. |
| 6,127,761 A | | 10/2000 | Shen et al. |

FOREIGN PATENT DOCUMENTS

| JP | 57-78334 | * | 5/1982 | ............ H02K/1/18 |
|---|---|---|---|---|

* cited by examiner

*Primary Examiner*—Burton S. Mullins
(74) *Attorney, Agent, or Firm*—Banner & Witcoff, Ltd.

(57) ABSTRACT

A power generator that operates at a reduced keybar voltages and currents, flange currents, and keybar voltage differentials includes a keybar shield that reduces the amount of magnetic flux coupling into a keybar of multiple keybars during operation of the generator. By reducing the amount of coupled flux, the keybar shield reduces a keybar voltage and a keybar current in a keybar, reduces keybar current flowing into a flange, and reduces a voltage differential between voltages induced by the flux in the multiple keybars.

46 Claims, 12 Drawing Sheets